United States Patent [19]

Jones et al.

[11] Patent Number: 4,550,155

[45] Date of Patent: Oct. 29, 1985

[54] PREPARATION OF BRANCHED POLYCARBONATES BY TRANSESTERIFICATION WITH A TRIARYL TRICARBOXYLIC ACID BRANCHING AGENT

[75] Inventors: James F. Jones, Windsor; John B. Starr, Jr., Pittsfield, both of Mass.

[73] Assignee: General Electric Co., Pittsfield, Mass.

[21] Appl. No.: 548,419

[22] Filed: Nov. 3, 1983

[51] Int. Cl.$^4$ .................... C08G 63/62; C08G 63/64
[52] U.S. Cl. .................... 528/176; 528/173; 528/191; 528/194; 528/196; 528/202
[58] Field of Search ............ 528/176, 191, 194, 196, 528/202, 172

[56] References Cited

U.S. PATENT DOCUMENTS

| | | |
|---|---|---|
| 3,161,614 | 12/1964 | Brown et al. .................... 260/46.5 |
| 3,169,121 | 9/1965 | Goldberg .................... 260/47 |
| 3,544,514 | 12/1970 | Schnell et al. .................... 260/47 |
| 3,692,744 | 9/1972 | Rich et al. .................... 260/75 T |
| 3,816,373 | 6/1974 | Hoogeboom .................... 528/176 |
| 3,897,392 | 7/1975 | Haupt et al. .................... 528/176 |
| 4,001,184 | 1/1977 | Scott .................... 528/176 |
| 4,130,548 | 12/1978 | Kochanowski .................... 528/176 |
| 4,131,575 | 12/1978 | Adelmann et al. .................... 260/17.4 R |
| 4,277,600 | 7/1981 | Mark et al. .................... 528/204 |
| 4,294,953 | 10/1981 | Quinn et al. .................... 528/176 |
| 4,383,092 | 5/1983 | Ko et al. .................... 526/62 |

*Primary Examiner*—Lester L. Lee
*Attorney, Agent, or Firm*—Hedman, Gibson, Costigan & Hoare

[57] ABSTRACT

This invention relates to branched polycarbonates that are made by transesterification having a triaryl tricarboxylic acid as a branching agent.

7 Claims, No Drawings

PREPARATION OF BRANCHED POLYCARBONATES BY TRANSESTERIFICATION WITH A TRIARYL TRICARBOXYLIC ACID BRANCHING AGENT

This invention relates to novel branched polycarbonate polymers that are made by transesterification with a triaryl ester of a tricarboxylic acid as the branching agent.

BACKGROUND OF THE INVENTION

Polycarbonates are well known, commercially important materials that are produced in large quantities. These polymers may be produced by reaction of bisphenols with a carbonate precursor. The present invention is concerned with polycarbonates that are made by transesterification of bisphenols with a diaryl carbonate. These polycarbonates differ from the polycarbonates made by direct reaction between bisphenols and phosgene in that they have a relatively high proportion of terminal hydroxyl groups while the polycarbonates prepared directly from bisphenols and phosgene are predominantly terminated with phenyl carbonate units. The polycarbonates are useful as molding agents because they have outstanding mechanical, thermal and optical properties such as high tensile strength, optical clarity (transparency), thermal stability, dimensional stability and impact strength.

These aromatic polycarbonates differ from most thermoplastic polymers in their melt rheology behavior. Most thermoplastic polymers exhibit non-Newtonian flow characteristics over essentially all melt processing conditions. Newtonian flow is defined as the type of flow occurring in a liquid system where the rate of shear is directly proportional to the shearing force. However, in contrast to most thermoplastic polymers, polycarbonates prepared from dihydric phenols exhibit Newtonian flow at normal processing temperatures and shear rates below 300 reciprocal seconds.

Two other characteristics of molten thermoplastic polymers are considered to be significant for molding operations: melt elasticity and melt strength. Melt elasticity is the recovery of the elastic energy stored within the melt from distortion or orientation of the molecules by shearing stresses. Melt strength may be simply described as the tenacity of a molten strand and indicates the ability of the melt to support a stress. Both of these characteristics are important in extrusion blow molding, particularly in fabrication by extrusion blow molding. Non-Newtonian flow characteristics tend to impart melt elasticity and melt strength to polymers thus allowing their use in blow molding fabrication. In the usual blow molding operation, a tube of a molten thermoplastic is extruded vertically downward into a mold, followed by the introduction of a gas, such as air, into the tube thus forcing the plastic to conform to the shape of the mold. The length of the tube and the quantity of material forming the tube are limiting factors in determining the size and wall thickness of the object that can be molded by this process. The fluidity of the melt obtained from bisphenol-A polycarbonate, or the lack of melt strength as well as the paucity of extrudate swelling, serve to limit blow molding applications to relatively small, thin walled parts. Temperatures must generally be carefully controlled to prevent the extruded tube from falling away before it attains the desired length and the mold is closed around it for blowing. Consequently, the Newtonian behavior of polycarbonate resin melts has severely restricted their use in the production of large hollow bodies by conventional extrusion blow molding operations as well as the production of various other shapes by profile extrusion methods.

Thermoplastic randomly branched polycarbonates exhibit unique properties of non-Newtonian flow, melt elasticity and melt strength which permit them to be used to obtain such articles as bottles which were not heretofore easily or readily produced with linear polycarbonates.

In the prior art, branched polycarbonates have been prepared using trifunctional derivatives in conjunction with a polycarbonate forming reaction between aromatic dihydric phenols and carbonyl halides. Examples of these processes are found in U.S. Pat. No. 4,001,184; U.S. Pat. No. 3,544,514 and U.S. Pat. No. 4,277,600, all of which are incorporated by reference.

It has been found by the applicants that a branched polycarbonate may be prepared, which is useful for blow molding applications, by transesterifying an aromatic bisphenol and a diaryl carbonate in the presence of a triaryl ester of a tricarboxylic acid.

Therefore, it is a primary object of this invention to prepare a polycarbonate that is useful for blow molding applications and other applications requiring a high melt strength.

DETAILED DESCRIPTION OF THE INVENTION

The invention is concerned with branched polycarbonate resins. In particular, it is directed to the making of branched polycarbonate resins that are derived from the transesterification of bisphenols, a diarylcarbonate and a triaryl trimellitate.

The dihydric phenols that may be utilized in the practice of the invention include bis(4-hydroxyphenyl) methane; 1,1-bis(4-hydroxyphenyl)ethane; 2,2-bis(4-hydroxyphenyl)propane, also known as bisphenol-A or BPA, 2,2-bis(4-hydroxy-3-methylphenyl)propane, 3,3-bis(4-hydroxyphenyl) pentane, 2,2-bis(4-hydroxy-3-chlorophenyl)propane, 2,2-bis(4-hydroxy-3,5-dibromophenyl)propane, 1,1-bis(4-hydroxyphenyl)cyclohexane, p,p'-dihydroxydiphenyl, 3,3'-dichloro-4,4'-dihydroxydiphenyl, bis(4-hydroxyphenyl)ether, bis (4-hydroxyphenyl)sulfone, bis(3,5-dimethyl-4-hydroxyphenyl) sulfone, resorcinol, hydroquinone; 1,4-hydroxy-2,5-dichlorobenzene, 1,4-dihydroxy-3-methylbenzene, bis(4-hydroxyphenyl) sulfoxide, bis(4-hydroxyphenyl)-sulfide, bis(3,5-dimethyl-4-hydroxyphenyl)sulfoxide, and the like. A variety of additional dihydric phenols can also be employed such as are disclosed in U.S. Pat. Nos. 2,999,835; 3,028,365 and 3,153,008. It is, of course, possible to employ two or more different dihydric phenols or a copolymer of a dihydric phenol with glycol or with hydroxy or acid terminated polyester, or with one or more bibasic acids in the event a polycarbonate copolymer or copolyestercarbonate rather than a homopolymer is desired for use in the preparation of the branched polymers of this invention. The preferred dihydric phenol is bisphenol-A.

The carbonate precursor employed is a diaryl carbonate such as diphenyl carbonate that will react with the aromatic bisphenol and the triaryl ester of a tricarboxylic acid to yield a branched polycarbonate having an intrinsic viscosity (IV) of 0.3 to 1.0 dl/g as measured in methylene chloride at 25° C. These branched polycarbonates are substantially free of cross linking.

The branched polycarbonates may be prepared by transesterification processes that are known in the art such as the procedures described in U.S. Pat. No. 3,153,008 and U.S. Pat. No. 4,383,092.

The triaryl esters of the tricarboxylic acids that are useful as branching agents in the practice of the present invention are preferably of the formula:

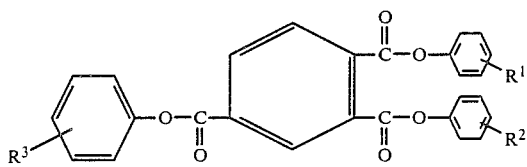

wherein $R^1$, $R^2$ and $R^3$ are independently selected from hydrogen and lower alkyl of from 1 to 6 carbons. The preferred triaryl ester of a tricarboxylic acid is triphenyl trimellitate.

The amount of the triaryl ester of the tricarboxylic acid branching agent that is employed in the preparation of the randomly branched, thermoplastic polycarbonates of the invention is critical to the extent that the amount of the branching agent should produce a material that is substantially free of cross-linking. If the amount of triaryl tricarboxylic acid is kept below about 1 mole % based on the moles of the aromatic bisphenol, the resulting polymer will not exhibit any substantial degree of cross-linking. If the amount of triaryl tricarboxylic acid is below about 0.01 mole % of the moles of the aromatic bisphenol, the resulting polymer will not exhibit the degree of non-Newtonian melt characteristics desired for blow molding and/or extrusion applications. Preferably, it is desired to use from 0.03 to 0.3 mole % based on the moles of the aromatic bisphenol.

The branched polycarbonates produced according to the instant invention are soluble in selected organic solvents and can be worked into shaped articles from solutions, such as into films. Being thermoplastic, these branched polycarbonates, can be easily fabricated by conventional shaping methods from melt, such as by extrusion, molding, blow-molding, lamination and the like.

The branched polycarbonates of the invention may be combined with other polycarbonates or with thermpolastic polyesters such as polyethylene terephthalate or poly(1,4-butylene terephthalate). In addition, these branched polycarbonates may be combined with reinforcing fillers such as filamentous glass or with non-reinforcing fillers, mold release agents, flame retardants, impact modifiers, extrusion aids, light stabilizers, flame retardants, foaming agents, such as those disclosed in U.S. Pat. No. 4,263,409 and Ger. Offen. 2,400,086, which are incorporated by reference, and the like if desired.

DESCRIPTION OF THE PREFERRED EMBODIMENTS

The following examples are set forth to illustrate the invention and are not to be construed to limit the scope of the invention.

EXAMPLE 1

One hundred grams (0.439 mole) of bisphenol-A, 97.6 grams (0.456 mole) diphenyl carbonate, 0.05 grams (0.0001 mole) of triphenyl trimellitate (0.023 mole percent, based on the moles of the aromatic dihydric phenol), and 0.005 grams LiOH catalyst are charged into a reaction vessel which is equipped with: a mechanical stirrer, a thermometer and a connection to a source of purge gas, and connected to a distillation column and receiver. The distillation receiver has a port through which the receiver, column, and reaction vessel may be connected to a source of vacuum. The mixture is homogenized at 140° C. and a flow of purge gas is established. The reaction mixture is heated to 220° up to 240° C. in 1½ to 2½ hours during which time distillation of phenol commences. The polymerization mixture is maintained at the polymerization temperature and the pressure above the polymerization mixture is reduced. Distillation of phenol at reduced pressues of 100 mm to about 8 mm Hg is maintained until 80% to 90% of the theoretical amount of phenol is distilled off. The polymer may be advanced to any desired degree of polymerization by subjecting it further to elevated temperatures to about 285° C. and pressures below 1 mm Hg.

Branched polymers thus obtained have good color and are characterized according to their intrinsic viscosity (30° C. in chloroform) and melt index ratio. Melt index ratio relates the melt flow of the polymer under the shearing force produced by a 21,600 gram load to that under the shearing force produced by a 2,160 gram load in a test of the type described by ASTM D 1238, procedure A, at a temperature of 300° C. The melt index ratio gives a measure of the deviation from Newtonian behavior of the melt of the branched polycarbonate.

When a sample of the 80% to 90% conversion polymer described above was subjected to a temperature of 285° C. and a pressure of less than 1 mm Hg for about one hour the intrinsic viscosity of the resulting polymer was 0.67 dl./g. The melt index ratio of the resulting branched polycarbonates was 14.

EXAMPLE 2

The procedure of Example 1 was repeated except that 0.10 gram (0.046 mole percent, based on the moles of the aromatic dihydric phenol) of triphenyl trimellitate was charged. When the 80% to 90% conversion polymer was subjected to a temperature of 285° C. and a pressure of less than 1 mm Hg for 50 minutes the intrinsic viscosity of the resulting branched polycarbonate was 0.70 dl./g. and its melt index ratio was 19.

EXAMPLE 3

The procedure of Example 1 was repeated except that 0.40 gram (0.182 mole percent, based on the moles of the aromatic dihydric phenol) of triphenyl trimellitate was charged. When a sample of the 80% to 90% coversion polymer was subjected to a temperature of 285° C. and a pressure less than 1 mm Hg for 45 minutes, the intrinsic viscosity of the resulting branched polycarbonate was 0.74 dl./g. and its melt index ratio was 22. The strand of melt exiting from the plastometer had excellent tenacity.

EXAMPLE 4

The procedure of Example 1 was repeated except that 1.0 gram (0.456 mole percent, based on the moles of the aromatic dihydric phenol) of triphenyl trimellitate was charged. When the 80% to 90% conversion polymer was subjected to a temperature of 285° C. and a pressure less than 1 mm Hg for 20 minutes a crosslinked polymer was obtained. The entirety of the sample was not soluble in methylene chloride but only swollen. The intrinsic viscosity of that portion of the polymer soluble in chloroform was 0.98.

CONTROL EXAMPLE

This example does not illustrate the instant invention and is included for comparison only. The procedure of Example 1 was repeated except that the charge to the polymerization vessel comprised 100 gram (0.438 mole) bisphenol A and 200 gram (0.467 mole) diphenyl carbonate and 0.005 mole catalyst. When the 80% to 90% conversion polymer was subjected to a temperature of 285° C. and a pressure of less than 1 mm Hg for 60 minutes the intrinsic viscosity of the polycarbonate was 0.54 and the melt index ratio was 13.

Other variations are possible in light of the above teachings. It is, therefore, to be understood that changes may be made in the embodiments of the invention described that are within the full intended scope of the invention as defined by the appended claims.

We claim:

1. A method of making a high molecular weight, thermoplastic randomly branched polycarbonate having an intrinsic viscosity of 0.30 to 1.0 which comprises polymerizing an aromatic dihydric phenol by transesterification with a diaryl carbonate in the presence of from about 0.01 to about 1.0 mole percent, based on the moles of the aromatic dihydric phenol, of a branching agent consisting solely of a triaryl ester of a trifunctional carboxylic acid.

2. A method of making a high molecular weight, thermoplastic randomly branched polycarbonate as defined in claim 1 wherein said aromatic dihydric phenol is 2,2-bis(4-hydroxyphenyl)propane.

3. A method of making a high molecular weight, thermoplastic randomly branched polycarbonate as defined in claim 1 wherein the diaryl carbonate is diphenyl carbonate.

4. A method of making a high molecular weight, thermoplastic randomly branched polycarbonate as defined in claim 2, wherein the triaryl ester of a tri-carboxylic acid is of the formula:

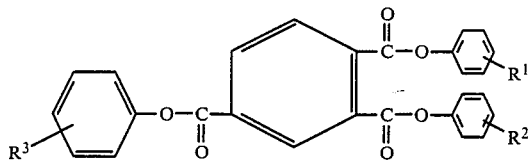

wherein $R^1$, $R^2$ and $R^3$ are independently selected from the group consisting of hydrogen and lower alkyl of from 1 to 6 carbon atoms.

5. A method of making a high molecular weight, thermoplastic randomly branched polycarbonate as defined in claim 3 wherein the triaryl ester of a tri-carboxylic acid is triphenyl trimellitate.

6. A method of making a high molecular weight, thermoplastic randomly branched polycarbonate which comprises transesterifying 2,2-bis(4-hydroxyphenyl)-propane with diphenyl carbonate in the presence of 0.03 to 0.30 mole %, based on the moles of 2,2-bis(4-hydroxyphenyl)propane, of triphenyl trimellitate.

7. A method of making a high molecular weight, thermoplastic randomly branched polycarbonate as defined in claim 1, wherein the amount of said triaryl ester of a trifunctional carboxylic acid is from about 0.03 to about 0.3 mole percent, based on the moles of the aromatic dihydric phenol.

* * * * *